(12) United States Patent
Kline et al.

(10) Patent No.: US 11,068,552 B2
(45) Date of Patent: Jul. 20, 2021

(54) UPDATING SOCIAL MEDIA POST BASED ON SUBSEQUENT RELATED SOCIAL MEDIA CONTENT

(71) Applicant: International Business Machines Corporation, Armonk, NY (US)

(72) Inventors: Eric V. Kline, Rochester, MN (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 372 days.

(21) Appl. No.: 16/135,239

(22) Filed: Sep. 19, 2018

(65) Prior Publication Data
US 2020/0089812 A1    Mar. 19, 2020

(51) Int. Cl.
| | | |
|---|---|---|
| G06F 16/00 | (2019.01) | |
| G06F 16/9535 | (2019.01) | |
| G06F 3/0484 | (2013.01) | |
| G06F 16/58 | (2019.01) | |
| G06F 16/583 | (2019.01) | |
| G06F 16/9537 | (2019.01) | |

(52) U.S. Cl.
CPC ...... *G06F 16/9535* (2019.01); *G06F 3/04842* (2013.01); *G06F 16/58* (2019.01); *G06F 16/583* (2019.01); *G06F 16/9537* (2019.01)

(58) Field of Classification Search
None
See application file for complete search history.

(56) References Cited

U.S. PATENT DOCUMENTS

| 9,110,953 | B2 | 8/2015 | Steinberg et al. | |
|---|---|---|---|---|
| 9,325,653 | B1 | 4/2016 | Peterson et al. | |
| 2015/0058750 | A1* | 2/2015 | Chakra | H04L 65/403 |
| | | | | 715/753 |
| 2017/0149714 | A1* | 5/2017 | Valdivia | H04L 51/32 |
| 2017/0302610 | A1 | 10/2017 | Naidu | |
| 2017/0344246 | A1* | 11/2017 | Burfitt | G06Q 10/10 |
| 2019/0205743 | A1* | 7/2019 | Jiang | G06N 3/08 |

OTHER PUBLICATIONS

Sullivan, Laurie; MediaPost; Facebook Updates Patent Filing: Real-Time Search in Social Network; "https://www.mediapost.com/publications/article/209607/facebook-updates-patent-filing-real-time-search-i.html"; Dated: Sep. 20, 2013; Retrieved: Sep. 10, 2018; 2 Pages.

* cited by examiner

*Primary Examiner* — Anhtai V Tran
(74) *Attorney, Agent, or Firm* — Cantor Colburn LLP; Tihon Poltavets

(57) ABSTRACT

Methods, systems and computer program products for updating a social media post based on subsequent related social media content. Aspects include receiving first social media content and second social media content, wherein the first and second social media are displayed in a respective first and second social media posts associated with a user account. Aspects also include determining that the first social media content is correlated to the second social media content based on contextual analysis. Aspects also include updating the first social media post to include an indication of the second social media post.

19 Claims, 11 Drawing Sheets

UPDATING SOCIAL MEDIA POST BASED ON SUBSEQUENT RELATED SOCIAL MEDIA CONTENT

BACKGROUND

The present invention generally relates to social media posting, and more specifically, to updating a social media post based on subsequent related social media content.

People commonly use social networking services to post and share social media content such as status updates, messages, images and videos. For example, a user may take a picture of a sporting event the user is attending and create a social media post that includes the picture, the time, the location and a caption of the event, which may be viewed by other users of the social networking service. Such posts may commonly viewed on websites accessed with a computer or through mobile applications accessed with a mobile device. Because of the high volume of social media content that is generated and posted to social networking services, when viewing a particular post, a user is not likely to be aware that a later-created social media post relates to the present social media post being viewed by the user.

SUMMARY

Embodiments of the present invention are directed to a computer-implemented method for updating a social media post based on subsequent related social media content. A non-limiting example of the computer-implemented method includes receiving first social media content. The first social media content can be displayed in a first social media post associated with a user account. The method further includes receiving second social media content. The second social media content can be displayed in a second social media post associated with the user account. The method further includes determining that the first social media content is correlated to the second social media content based on contextual analysis. The method further includes updating the first social media post to include an indication of the second social media post.

Embodiments of the present invention are directed to a system for updating a social media post based on subsequent related social media content. The system includes a memory having computer readable computer instructions, and a processor for executing the computer readable instructions. The computer-readable include instructions for receiving first social media content. The first social media content can be displayed in a first social media post associated with a user account. The computer-readable instructions also include instructions for receiving second social media content. The second social media content can be displayed in a second social media post associated with the user account. The computer-readable instructions also include instructions for determining that the first social media content is correlated to the second social media content based on contextual analysis. The computer-readable instructions also include instructions for updating the first social media post to include an indication of the second social media post.

Embodiments of the invention are directed to a computer program product for updating a social media post based on subsequent related social media content. the computer program product comprising a computer readable storage medium having program instructions embodied therewith. The program instructions are executable by a processor to cause the processor to perform a method. A non-limiting example of the method includes receiving first social media content. The first social media content can be displayed in a first social media post associated with a user account. The method further includes receiving second social media content. The second social media content can be displayed in a second social media post associated with the user account. The method further includes determining that the first social media content is correlated to the second social media content based on contextual analysis. The method further includes updating the first social media post to include an indication of the second social media post.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
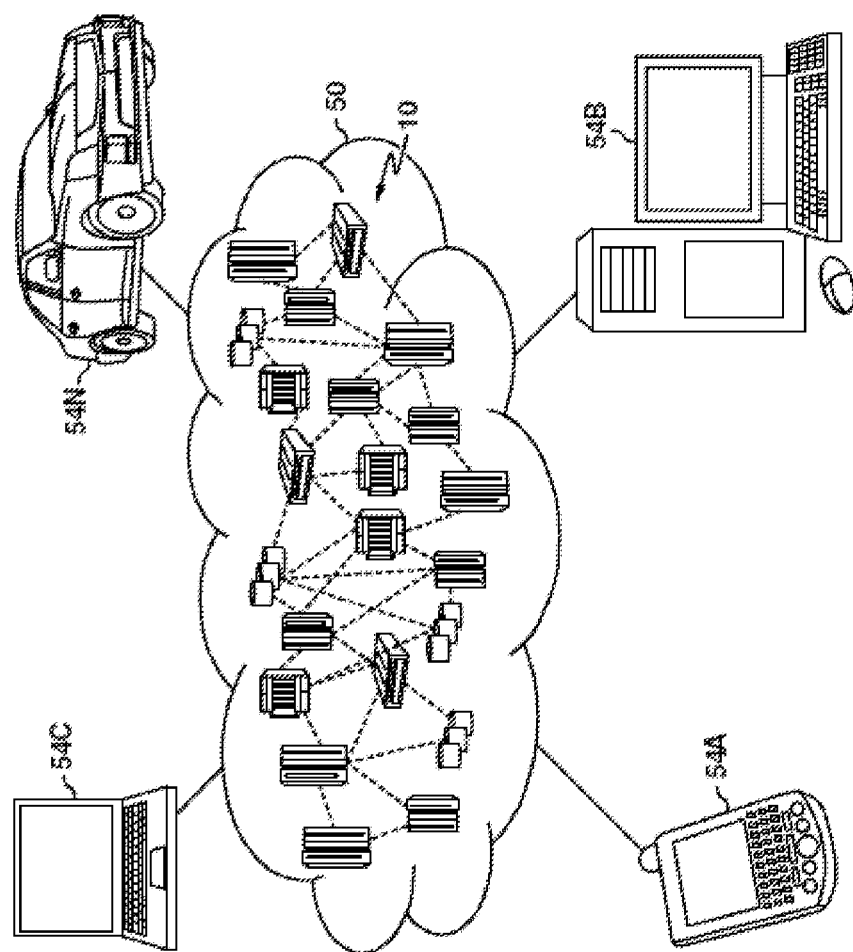
FIG. 1 depicts a cloud computing environment according to one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified.

Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
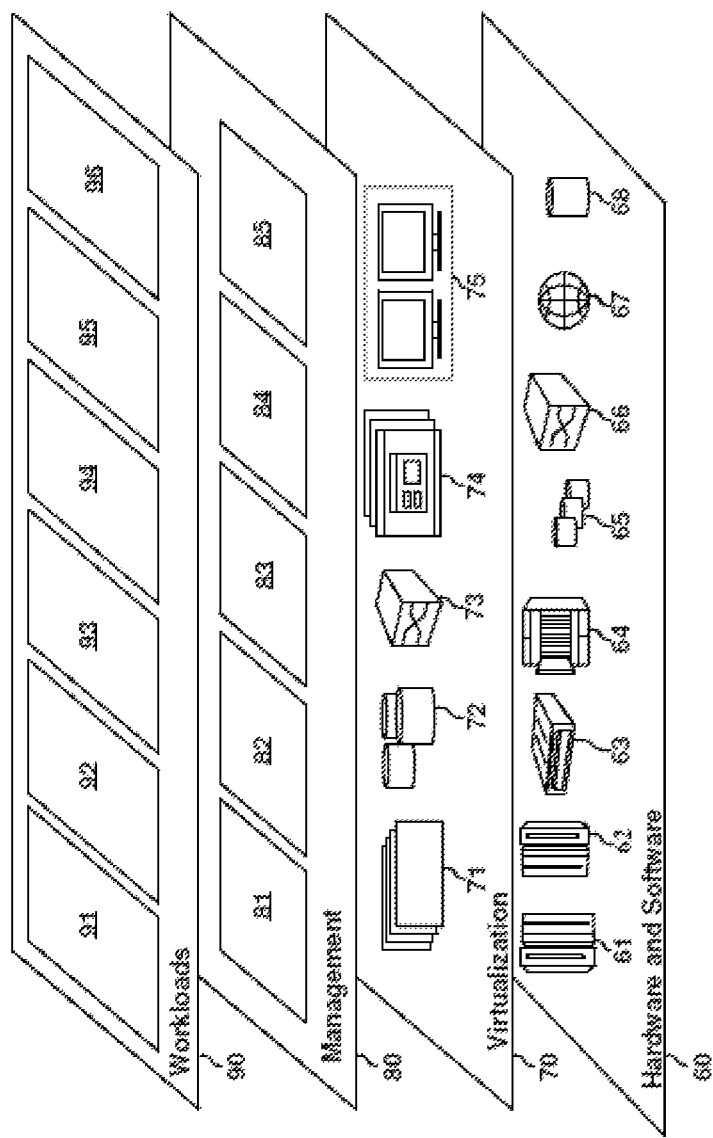
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and updating a social media post based on subsequent related social media content 96.

Figure 3:
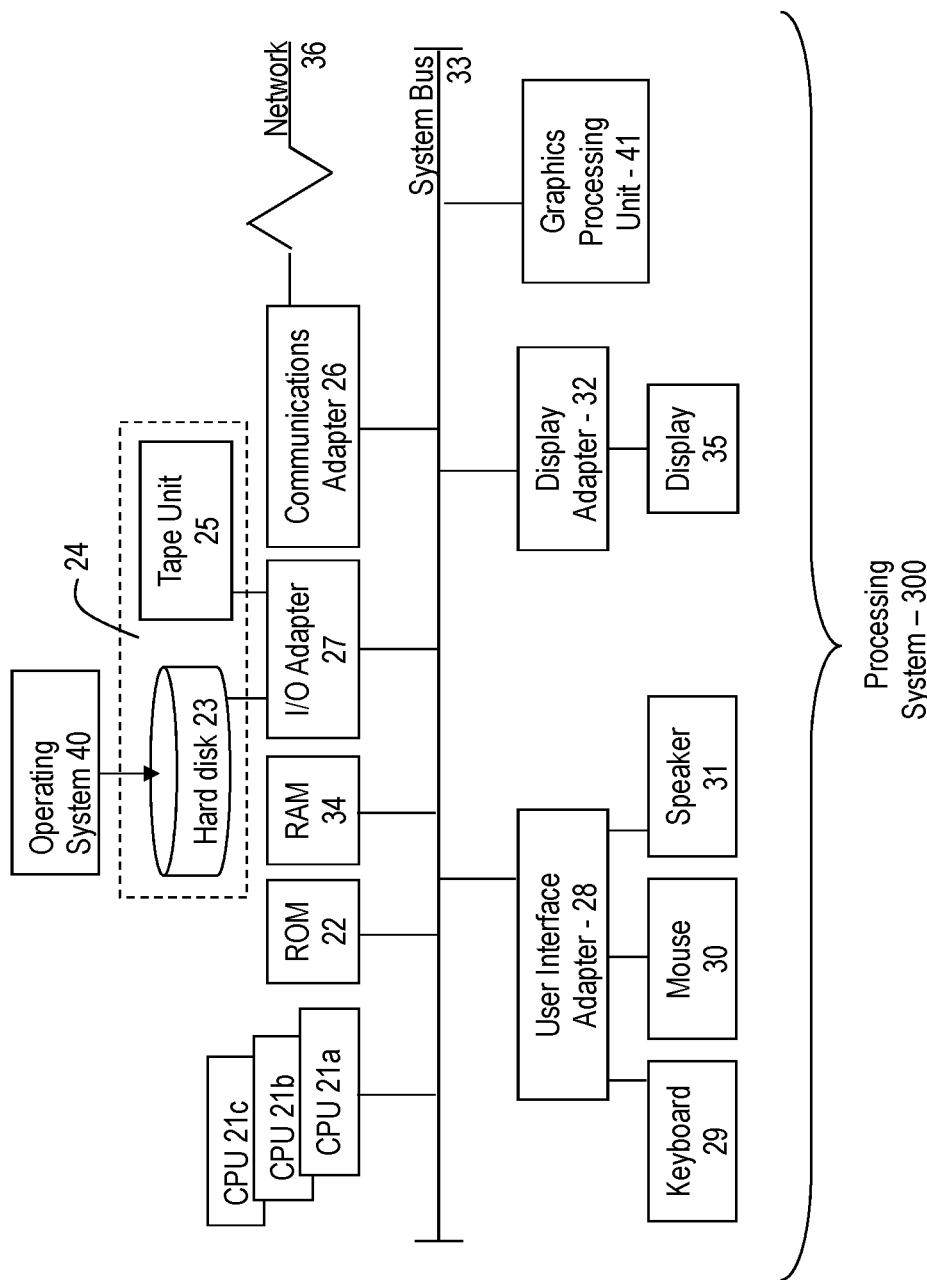
FIG. 3 depicts a block diagram of a computer system for use in implementing one or more embodiments of the present invention.

Referring to FIG. 3, there is shown an embodiment of a processing system 300 for implementing the teachings herein. In this embodiment, the system 300 has one or more central processing units (processors) 21a, 21b, 21c, etc. (collectively or generically referred to as processor(s) 21). In one or more embodiments, each processor 21 may include a reduced instruction set computer (RISC) microprocessor. Processors 21 are coupled to system memory 34 and various other components via a system bus 33. Read only memory (ROM) 22 is coupled to the system bus 33 and may include a basic input/output system (BIOS), which controls certain basic functions of system 300.

FIG. 3 further depicts an input/output (I/O) adapter 27 and a network adapter 26 coupled to the system bus 33. I/O adapter 27 may be a small computer system interface (SCSI) adapter that communicates with a hard disk 23 and/or tape storage drive 25 or any other similar component. I/O adapter 27, hard disk 23, and tape storage device 25 are collectively referred to herein as mass storage 24. Operating system 40 for execution on the processing system 300 may be stored in mass storage 24. A network adapter 26 interconnects bus 33 with an outside network 36 enabling data processing system 300 to communicate with other such systems. A screen (e.g., a display monitor) 35 is connected to system bus 33 by display adaptor 32, which may include a graphics adapter to improve the performance of graphics intensive applications and a video controller. In one embodiment, adapters 27, 26, and 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 all interconnected to bus 33 via user interface adapter 28, which may include, for example, a Super I/O chip integrating multiple device adapters into a single integrated circuit.

In exemplary embodiments, the processing system 300 includes a graphics processing unit 41. Graphics processing unit 41 is a specialized electronic circuit designed to manipulate and alter memory to accelerate the creation of images in a frame buffer intended for output to a display. In general, graphics processing unit 41 is very efficient at manipulating computer graphics and image processing and has a highly parallel structure that makes it more effective than general-purpose CPUs for algorithms where processing of large blocks of data is done in parallel.

Thus, as configured in FIG. 3, the system 300 includes processing capability in the form of processors 21, storage capability including system memory 34 and mass storage 24, input means such as keyboard 29 and mouse 30, and output capability including speaker 31 and display 35. In one embodiment, a portion of system memory 34 and mass storage 24 collectively store an operating system coordinate the functions of the various components shown in FIG. 3.

In exemplary embodiments, a system for updating a social media post based on subsequent related social media content is provided. Generally, social networking services display social media posts chronologically such that two related posts that are created at two different times will not generally be simultaneously displayed by the social networking site that a user viewing the first social media post will be aware that the related second (or more) social media post exists. This is problematic because it may cause waste both in terms of the amount of time and energy a user spends navigating through social media posts looking for content of interest and both in terms of the load placed on the system such as storing unnecessary comments such as a user commenting that they would like to see an update to a post when an update was already made in a later-created social media post and the additional resources required to support the additional time spent by users unnecessarily navigating through the system in search of content of interest. Many of these problems can be solved by a system that identifies related posts, updates posts to provide an indication of the related post and providing selectable items that allow quick navigation to and viewing of the related content. The system can also analysis past and present behavior, including a user's location, recent social media posts, and other users' interest in a particular social media post to predict and remotely prompt a user to provide anticipated updated social media content.

Figure 4:
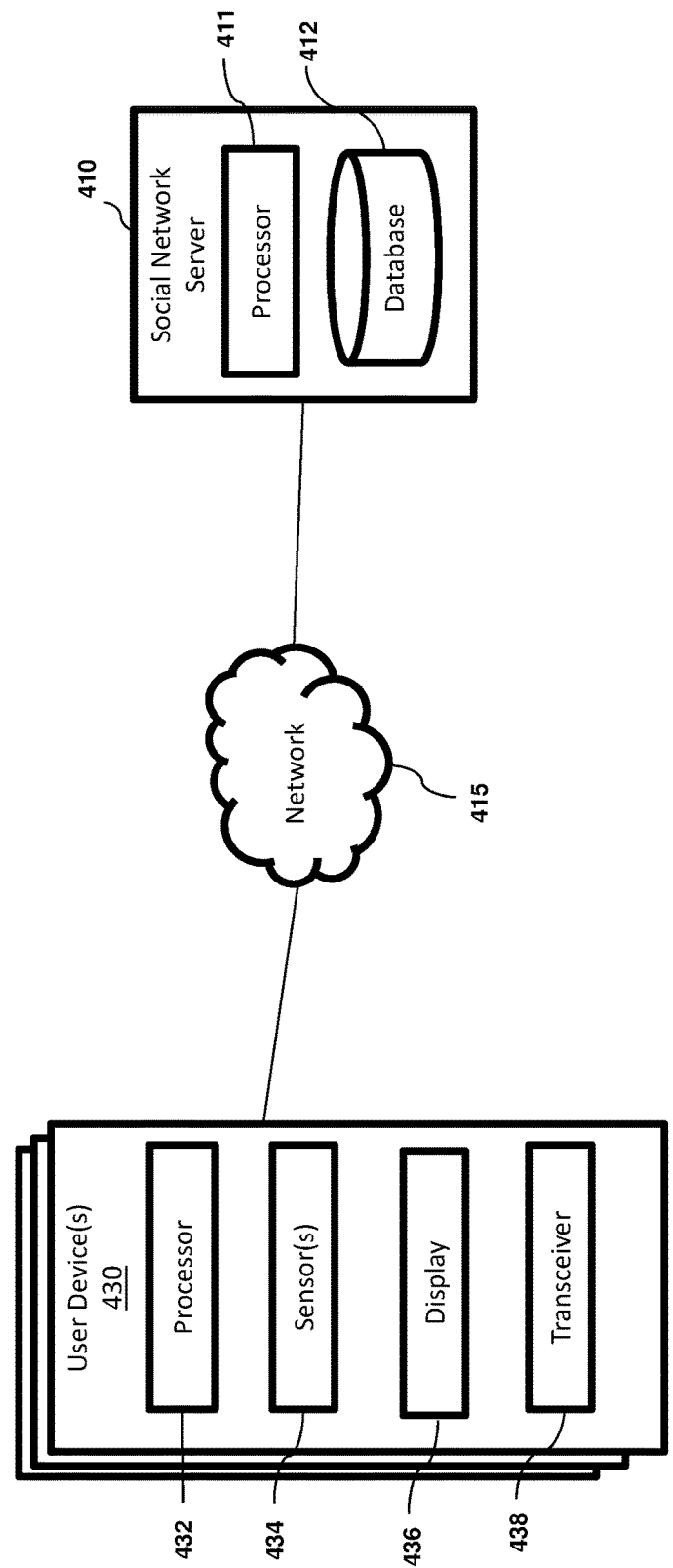
FIG. 4 depicts a system upon which updating a social media post based on subsequent related social media content may be implemented according to one or more embodiments of the present invention.

Turning now to FIG. 4, a system 400 for updating a social media post based on subsequent related social media content will now be described in accordance with an embodiment. The system 400 includes a social network server 410 in communication with user devices 430 via a communications network 415. The communications network 415 be one or more of, or a combination of, public (e.g., Internet), private (e.g., local area network, wide area network, virtual private network), and may include wireless and wireline transmission systems (e.g., satellite, cellular network, terrestrial networks, etc.). The user devices 430 are configured to create social media posts by uploading user input data (e.g., text, images, audio, etc.) to the social network server 410. The user devices 430 are also configured to display social media posts via a display 436 of the user device 430.

In exemplary embodiments, the user devices 430 can include, but are not limited to, a smartphone, a wearable device such as a smartwatch, a tablet, a laptop, a desktop computer, a smart television, a computer system such as the one shown in FIG. 3, or any other suitable electronic device. The user device 430 includes a processor 432, one or more sensors 434, a display 436 and a transceiver 438. The sensors 434 can include one or more of an image capture device (e.g., digital camera) for obtaining images and/or videos, a microphone for obtaining audio recordings, and a location sensor for obtaining location data of the user device (e.g., GPS coordinates). User devices 430 can include a keyboard (either physical or digital) for receiving user input text. Text can also be input orally via a microphone using voice recognition. In some embodiments, display 436 is configured to display images and video. In some embodiments, display 436 can be a touchscreen that may be configured to detect tactile user inputs (e.g., typing, pressing, swiping, etc.). Transceiver 438 can be configured to allow a user device 430 to communicate with other devices via communications network 415 (e.g., via Wi-Fi, cellular communications, etc.).

In some embodiments, user device 430 can include social networking client software that can facilitate interactions with social network server 410. For example, user device 430 may include a mobile application that allows a user to login to a user account of a social network (e.g., by entering a username and password), view social media content (e.g. social media posts), generate and upload social media posts. For example, a social networking client can allow a user to upload pictures, comments, status updates, videos, and other social media content. According to some embodiments, user device 430 may obtain location data (e.g., GPS data) via a location sensor 434 and can provide the location data to social network server 410 in association with a social media post uploaded by the user. The date and time of a newly created social media post may also be recorded by either the user device 430 or social network server 410. In some embodiments, some or all of these functionalities can be facilitated by a website hosted by social network server 410 that is remotely accessed by user device 430.

In some embodiments, social network server 410 can include a processor 411 and a database 412. According to various embodiments, although described as a server, social network server 410 can be implemented as a cloud computing environment (e.g., cloud computing environment 50 in FIG. 1) or a processing system such as the processing system 300 shown in FIG. 4. Social network server 410 includes software that is configured to receive social media content (e.g., text, images, audio recordings, videos, comments, etc.) and create or augment a social media post for display on the social networking service at the direction of a user. Social network server 410 can be configured to determine a time and date that a user created a post by noting the date and time at which the user submitted instructions to create the post. Further, social network server 410 can be configured to receive or request location data from a user device 430 that is known to be associated with a user account. For example, if a user is logged into a social networking service using their smartphone, social network server 410 can obtain location data from the smartphone. Accordingly, in some embodiments, social network server 410 can include a user's location or the location at which the post was created in a post based on the location data received from the user device 430. In some embodiments, location data may be manually input by a user. As will be appreciated by those of skill in the art, social network server 410 may also be configured to track and store social media posting, commenting, and viewing interactions of all users across the network.

In some embodiments, social network server 410 may include image recognition software. As will be appreciated by those of skill in the art, image recognition software can be capable of performing image recognition analysis on images and/or video to recognize and/or identify objects, individuals, words, places and the like. In some embodiments, social network server 410 can utilize recognized objects, individuals, words, places, etc. to determine the subject matter of a post. For example, if social network server 410 determines that an image shows a baseball stadium, the system may determine that the post is related to a baseball game. In some embodiments, social network server 410 may also utilize location data and other data (e.g., event schedules in a user's calendar, public information available on the internet, etc.) in determining the subject matter of a post. For example, if the location data indicates that the user is at a baseball stadium and the system can access data on the Internet that indicates that there is a particular baseball game occurring at that location in close proximity to the time of the post, then the system may determine that the post is related to the particular baseball game. Further, in some embodiments, social network server 410 may include natural language processing software to determine the subject matter of written text submitted by a user. As will be appreciated by those of skill in the art, natural language processing may analyze the content and structure of written text to determine the meaning of the text. For example, if a user creates a post with text that says "I can't wait to watch the Yankees play today!" the social network server 410 may use natural language processing techniques to determine that the subject matter of the post is a Yankees baseball game that is occurring later that day. According to some embodiments, social network server 410 can use any number of these techniques alone or in combination with one another to determine the subject matter of a post.

Social network server 410 may include software that can allow it to determine whether a second social media post is related or correlated to a first social media post based on a contextual analysis. For example, in some embodiments, social network server 410 can determine the subject matter of each of the first and second social media posts using the techniques described above and then may determine whether the similarity of the subject matters of the first and second social media posts exceeds a predetermined threshold. For example, if the system determines that the first post relates to a Yankees baseball game occurring later in the day and the second post relates to a sporting event at a particular location, the system may determine a likelihood that the two social media posts are referring to the same subject matter by, for example, the similarity of the objects being described/shown/referred to in the social media post, the similarity of the time frames being referred to, the similarity of the locations being referred to, the similarity of the participants being referred to and their social media activity (e.g., if a user cross-references other users in the social media post, the subject matter of the recent social media posts of those users may be taken into account as well). For example, the system may determine a first location of the first social media post based on first location data received from a user device 430 and a second location of the second social media post based on second location data received from user device 430 and determining that the first social media content is related (or correlated) to the second social media content may be based at least in part of determining that the second location is within a predetermined distance of the first location. According to some embodiments, social network server 410 can determine that the second social media post is related to the first social media post if the similarity between two social media posts exceeds a predetermined threshold. For example, in some embodiments, a similarity determination may be a probability that is represented as a percentage and the predetermined threshold may be, for example 85%, such that if the probability of the posts being related is greater than 85%, then social network server 410 will determine that the posts are related. As will be understood by those of skill in the art, there are many possible factors, techniques, and approaches that may be used to determine whether two posts should be considered to be related, and the factors, techniques, and approaches of the contextual analysis described herein are merely exemplary and are not intended to be limiting.

According to some embodiments, social network server 410 may analyze a plurality of social media posts (from one user or from a plurality of different users) to determine their relative degrees of relation to one another based on subject matter, proximity, closeness in time, overlap in the users that are viewing/liking/commenting on the subject matter, and other such aspects. According to some embodiments, the social network server 410 can be configured to categorize or classify each of the plurality of posts based on the subject matter of the post and may sort or display the plurality of posts in a sequence that is based on how closely related each post is to a first post. In some embodiments, a user may choose to arrange the sequential display of the plurality of social media posts base on one of a different aspects, such as for example, the degree of relatedness to a selected post, the degree of relatedness to a selected subject matter, proximity to a selected location, or chronology.

In some embodiments, social network server 410 can include software that is configured to allow social network server 410 to make predictions about whether a follow-up post to a first post is anticipated, and if so, when the follow-up post is expected to be made by the user based on previous posting behavior made by the user or made in association with the user account. For example, social network server 410 may receive historical data that includes a plurality of previous social media posts created by a user and can determine one or more of the subject matter, time/date of posting, the location of posting, and other such characteristics. Using these characteristics of the previous social media posts, the social network server 410 may determine patterns and/or correlations between posts. For example, social network server 410 may determine that a given user has a pattern of posting a first post in which they make some comment about starting a work shift, and then approximately 10 hours later the user creates a follow-up post about their shift being over. Accordingly, based on such determinations, the next time the user creates a post referring to the concept of being a work shift, the social network server 410 may predict that the user will later create a related post about completing their work shift in approximately 10 hours. In some embodiments, social network server 410 may utilize machine learning techniques to identify patterns of behavior and/or make predictions of future behavior based on the past social media posting history of a given user and/or other users of similar demographics (e.g., age, sex, location, job type, etc.).

Figure 5:
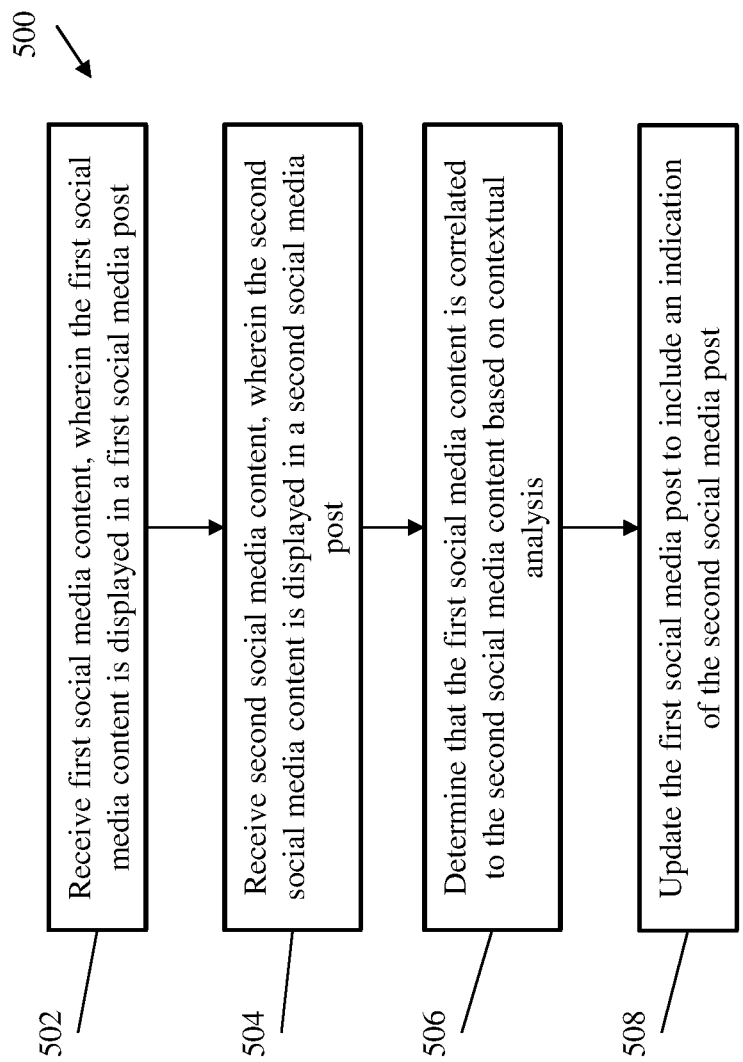
FIG. 5 depicts a flow diagram of a method for updating a social media post based on subsequent related social media content according to one or more embodiments of the present invention.
Figure 6:
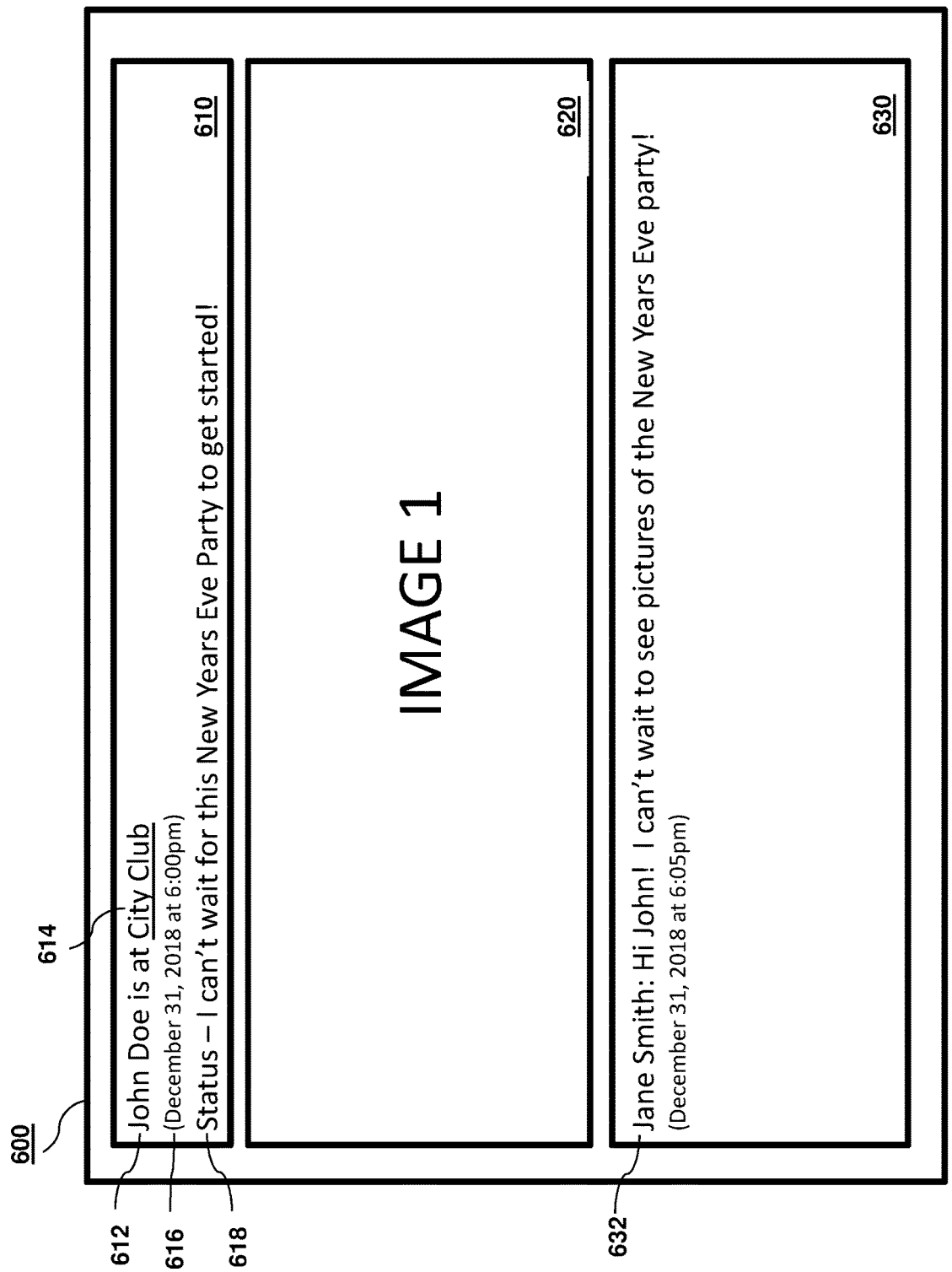
FIG. 6 depicts an exemplary first social media post according to one or more embodiments of the invention.

FIG. 5 depicts a flow diagram of a method 500 for updating a social media post based on subsequent related social media content according to one or more embodiments of the invention. The method 500 begins at block 502 and includes receiving first social media content (e.g., by the social network server 410), from, for example, a user device 430. The first social media content is displayed in a first social media post associated with a user account. For example, social network server 410 may publish the first social media post such that it may be viewed (e.g., via a web site or mobile application) by other users. FIG. 6 depicts an exemplary embodiment of a representative first social media post 600 that can be displayed by a user device 430. The first social media post can include one or more of a header 610, one or more images 620, and comments 630. According to some embodiments, the header 610 can include one or more of a user identification 612, a posting location 614, a time of post 616 and text 618. The user identification 612 identifies the user who created the social media post 600. The posting location 614 indicates the location of the user and/or user device 430 at the time the social media post was created and may be determined by social network server 410 and/or user device 430 based on location data obtained from user device 430. Similarly, the time of post 616 may be determined by social network server 410 and/or user device 430 based on clock associated with the each. Text 618 can be text that is input by a user via user device 430 and may represent a message, a status, a caption or any other such type of information as desired by the user. As shown in FIG. 6, the first social media post 600 may include one or more images 620 for display by the social networking service. Further, the first social media post 600 may include comments 630 (such as first comment 632) that may be submitted by users viewing the first social media post 600. It should be understood that the social media post depicted in FIG. 6 is merely exemplary and in some embodiments, a social media post may not include all of the aspects shown in FIG. 6 or may include additional aspects not shown in FIG. 6.

Figure 7:
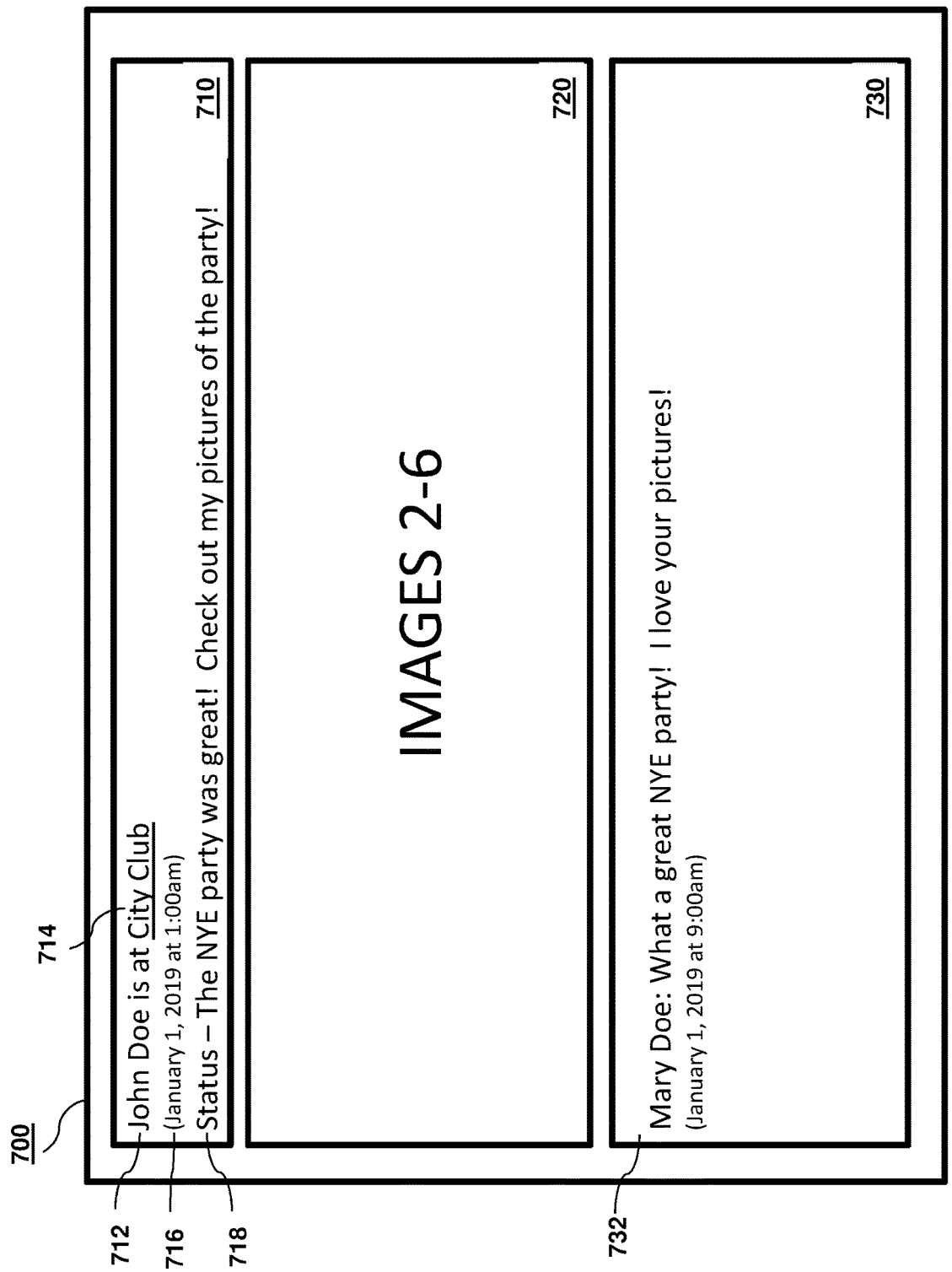
FIG. 7 depicts an exemplary second social media post according to one or more embodiments of the present invention.

Next, as shown in block 504, the method 500 includes receiving (e.g., by the social network server 410) second social media content. For example, the second social media content may be received from the same user device 430 from which it received the first social media content or a different user device 430 that is nonetheless logged in to the same user account associated with the first social media content. The second social media content is displayed in a second social post associated with the user account. For example, FIG. 7 depicts an exemplary second social media post 700 having a header 710 (including a user identification 712, a posting location 714, a time of posting 716 and text 718), one or more second images 720, and comments 730 (including a first comment 732).

Continuing with reference to FIG. 5, as shown in block 506, the method 500 includes determining that the first social media content is correlated (or related) to the second social media content based on a contextual analysis as described previously above with respect to social network server 410, by, for example, determining that the similarity of the subject matters of the first and second social media posts exceeds a predetermined threshold. By way of example, social network server 410 may determine, based on contextual analysis, that the subject matter first social media post 600 shown in FIG. 6 is a New Years Eve Party at the City Club, that has yet to begin, based on natural language processing of the text 618, consideration of the date and time (i.e., the post was made 6 hours before midnight on New Years Eve), consideration of the posting location 614, and possibly identification of objects, individuals, place or other items in image(s) 620. Similarly, social network server 410 may also determine that the second social media post 700 shown in FIG. 7 is also related to a New Years Eve party at the City Club. Based on the various aspects of each social media post, social network server 410 may determine a likelihood that the two posts are correlated, related, or otherwise refer to the same subject matter and in response to determining that the likelihood exceeds the predetermined threshold, will determine that the two social media posts are correlated or related.

Figure 8:
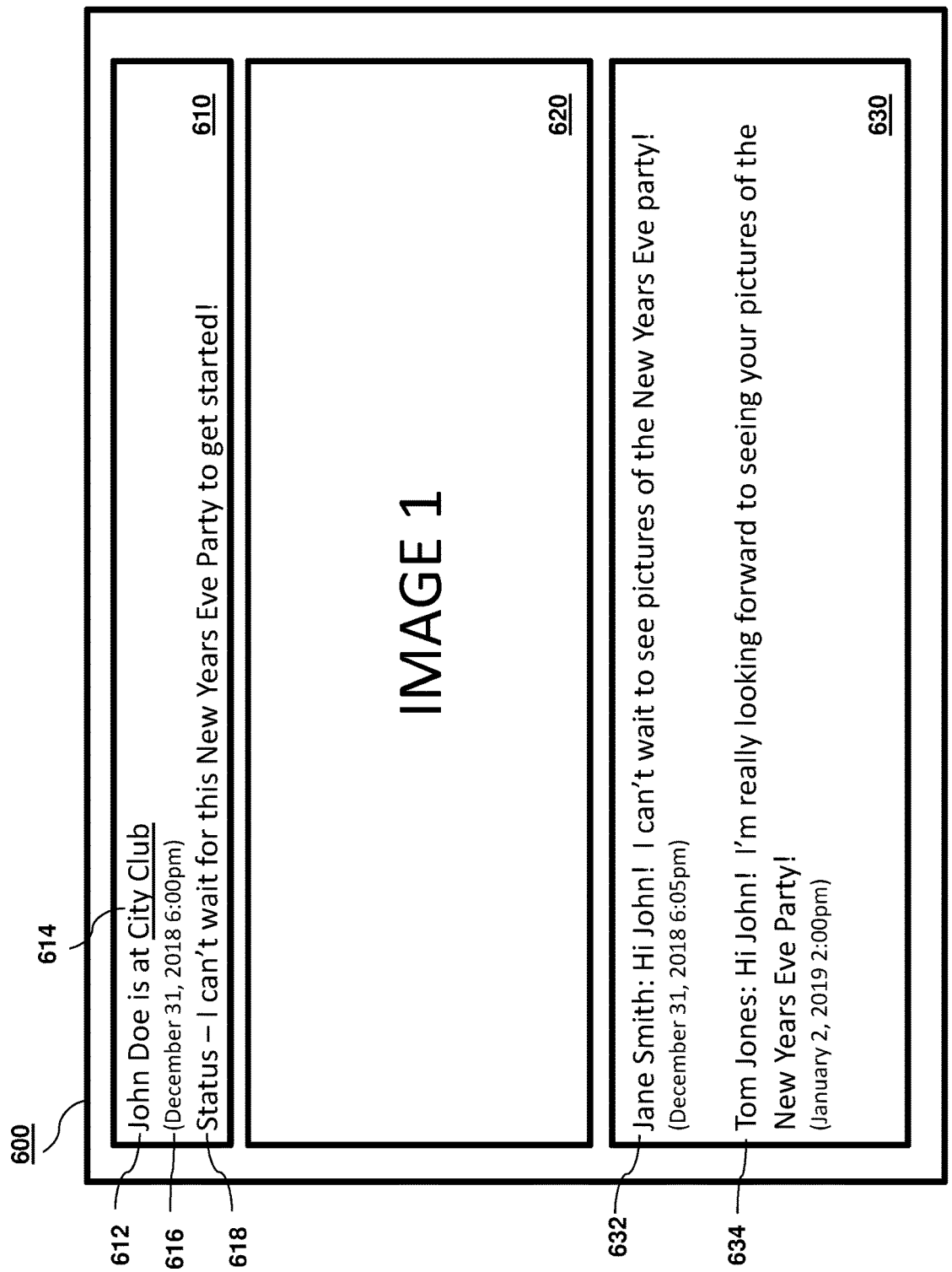
FIG. 8 depicts an exemplary first social media post having comments requesting anticipated future social media content according to one or more embodiments of the present invention.
Figure 9:
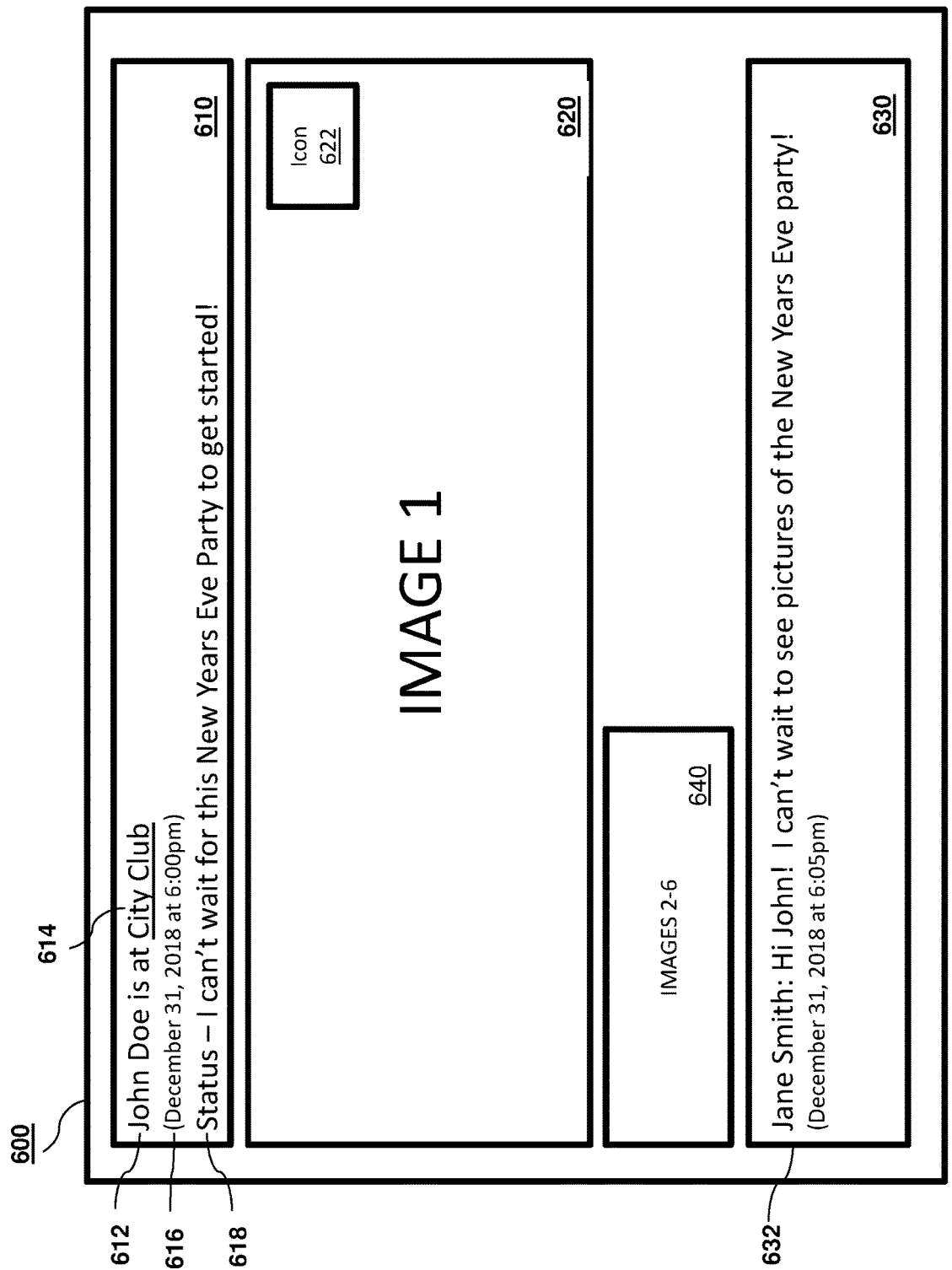
FIG. 9 depicts an exemplary first social media post including an indication of the second social media post according to one or more embodiments of the present invention.

Referring back to FIG. 5, as shown in block 508, the method 500 includes updating the first social media post to include an indication of the second social media post. For example, in response to determining that the later-created second social media post 700 relates (or correlates) to the first social media post 600, social network server 410 may update the first social media post 600 to include an indication of the second social media post 700. This is intended to avoid the problem depicted by FIG. 8, in which the user Tom Jones is viewing the first social media post 600 at 2:00 pm on Jan. 2, 2019, and in his comment 634 is requesting to see pictures of the New Years Eve party, without realizing that John Doe has already posted pictures of the New Years Eve Party in the second social media post 700. Because social network services often generally display social media posts chronologically, a user viewing a first social media post is not likely to know that a related later-created second social media post has been created without scrolling through all of the intervening social media posts, by which point the user may have forgotten about the first social media post. In other words, the conventional user interface, display and/or presentation of social media posts by social networking services does not allow a user to immediately know about later-created related content when viewing earlier-created content, which may cause the system to receive, store and process unnecessary data (e.g., comment 634) and may add significant effort and frustration to the user experience of the social networking service. For example, a user viewing the first post may completely miss out on viewing related later-created content that they would otherwise be interested in seeing because they were not aware of it and did not have the time to sift through multiple unrelated social media posts to discover the related content. Accordingly, in some embodiments and as shown in FIG. 9, social network server 410 can update the first social media post 600 to include an indication of the related second social media post 700 by, for example, updating a first image 620 to include an icon 622 (or image) that represents the existence of the related second social media post 700. According to some embodiments, the icon 622 can be selectable to display the second social media post 700. For example, in some embodiments, social network server 410 can be configured to display the second social media post 700 upon detecting a user selection of the icon 622. According to some embodiments, if the first social media post does not include an image, but only includes text, updating the first social media post may include providing an indication of the second social media post in association with the text by, for example, displaying an icon 622 next to, above, or below the text.

In some embodiments, social network server 410 may update the first social media post 600 to include one or more of a portion of text derived from the second social media post 700 and/or one or more thumbnail images 640 derived from the second social media post 700. For example, the first social media post 600 may be updated to show a portion of text 718 of the second social media post or thumbnail images 640 of images 720 from the second social media post 700 below the header 610 or image 620 of the first social media post. In some embodiments, the portion of the text and/or thumbnail images 640 may be selectable to display the second social media post in a manner similar to that of the icon 622. Accordingly, by displaying an indication of the related second social media post 700 in association with the first social media post 600, a user viewing the first social media post 700 can be made immediately aware of the related content, and may quickly navigate to the related content via a selectable indicator such as icon 620 or thumbnail image 640.

Figure 10:
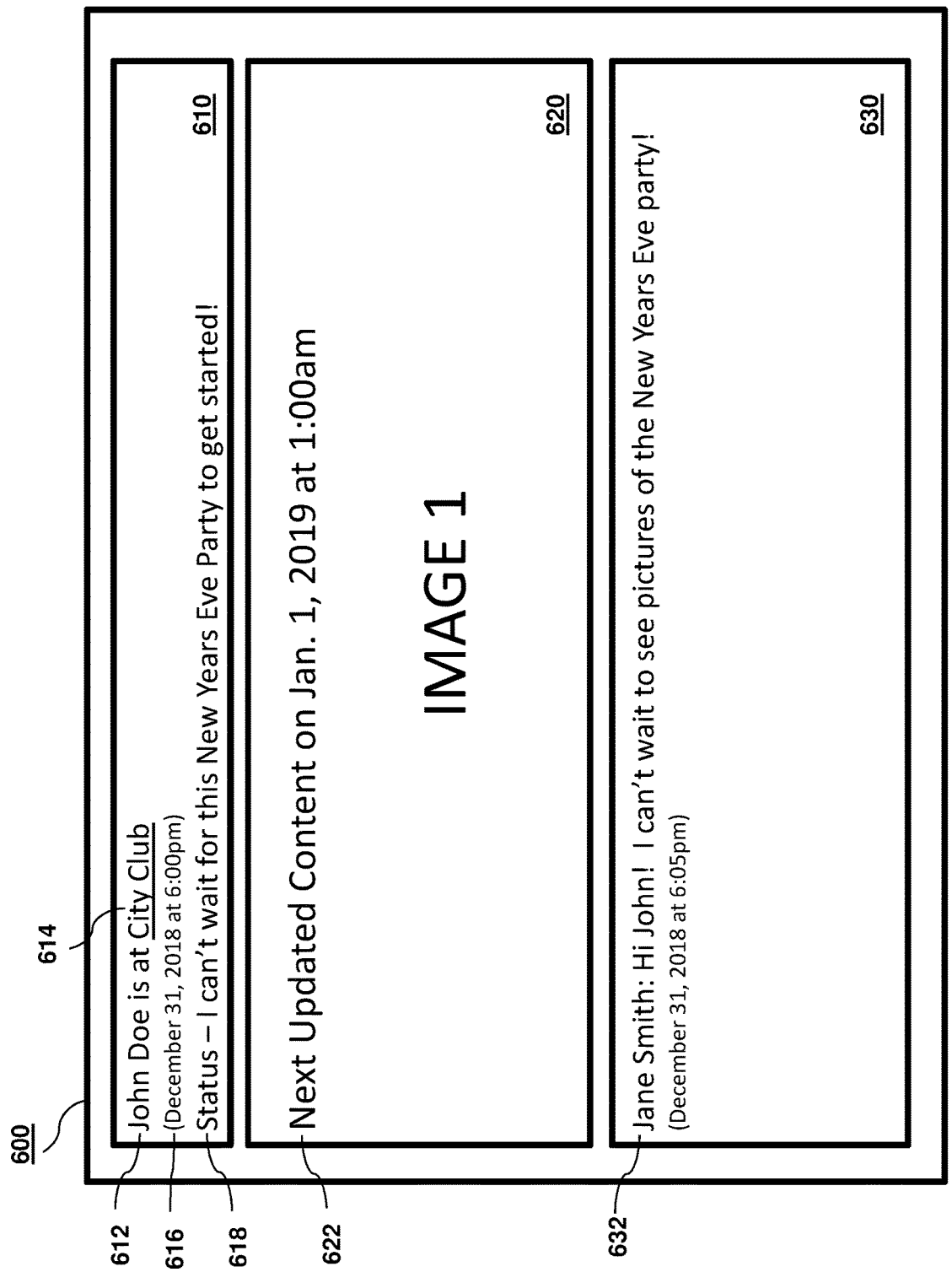
FIG. 10 depicts an exemplary first social media post including an indication of a predicted future time of an anticipated follow-up social media post according to one or more embodiments of the present invention.

As shown in FIG. 10, in some embodiments, social network server 410 may be configured to update a first social media post 600 to include an indication of a predicted future time 622 of an anticipated follow-up social media post. As described previously above, social network server 410 can be configured to analyze a social media post in view of the past history of social media posts made by the user to determine whether a related follow-up social media post is expected, and if so, what the expected future time of the follow-up post is. By updating a first social media post 600 to include the indication of the predicted future time 622 of the anticipated follow-up social media post, a user viewing the first social media post 600 may be notified to check back at the later time to view the expected content. In some embodiments, the anticipated future time 622 may be revised or updated by social network server 410 based on the location data received from the user device 430 of the user or other social media posts (e.g., a third social media post made by the user) that may indicate a delay or acceleration of the timeline of the expected follow-up social media post. According to some embodiments, the indication of the predicted future time 622 may be selectable by a user and in response to receiving a user selection of the predicted future time 622, social network server may register that the user viewing the first social media post 600 is interested in viewing the anticipated future follow-up social media post. In some embodiments, the social network server 410 may automatically notify the interested user when the anticipated follow-up social media post is created (or any updates to the predicted future time 622) so that the user is not required to keep checking for it.

Figure 11:
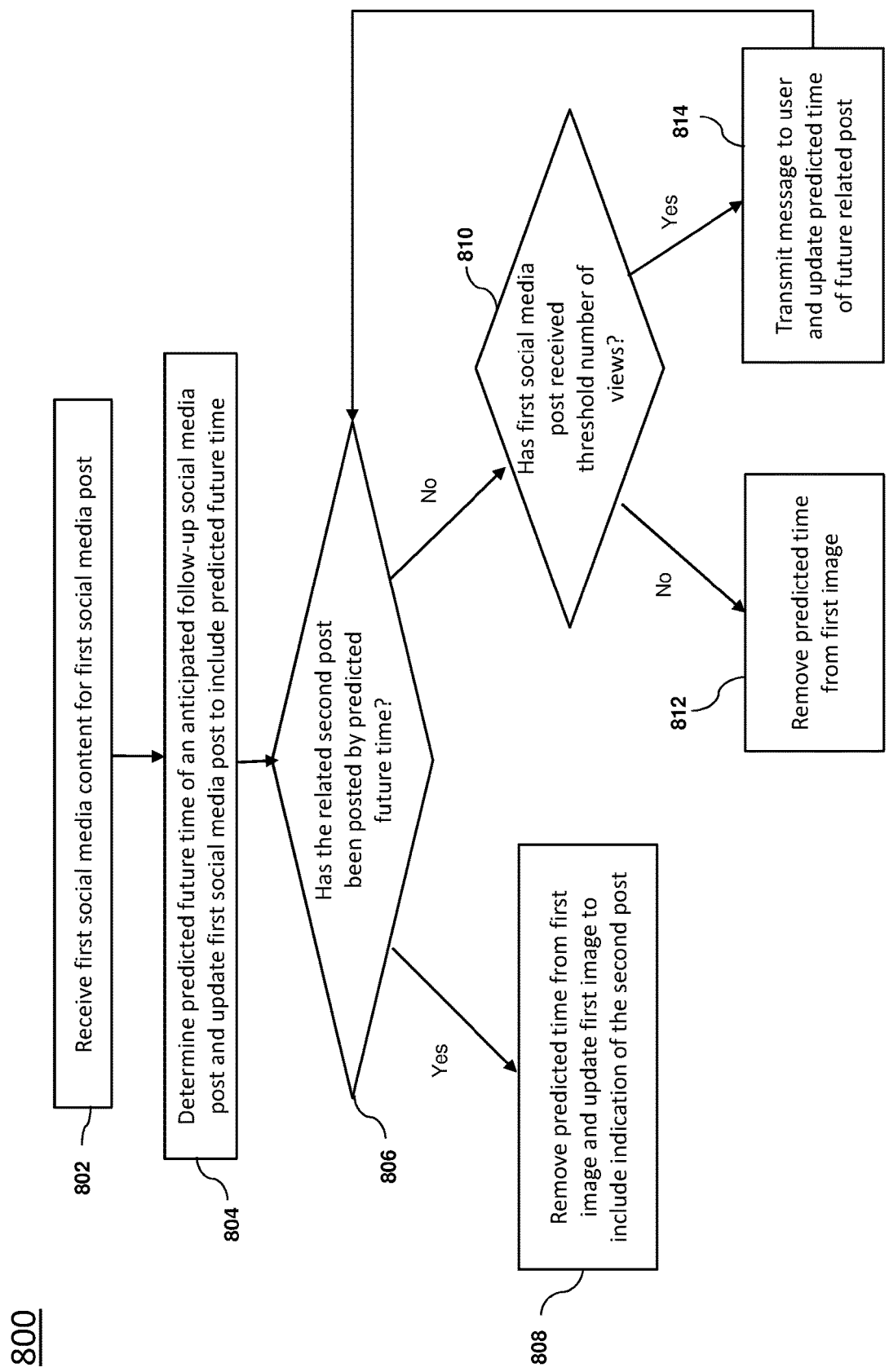
FIG. 11 depicts a flow diagram of a method for updating a social media post based on predicted future time of an anticipated follow-up social media post according to one or more embodiments of the present invention.

Turning now to FIG. 11, a flow diagram of a method 800 for updating a social media post based on predicted future time of an anticipated follow-up social media post according to one or more embodiments is shown. The method 800 begins at block 802 and includes receiving (e.g., at social network server 410 from a user device 430) first social media content. As described above, first social media content may include user input text and one or more images/videos. Social network server 410 then creates a social media post (e.g., social media post 600) for display on a social networking website and/or mobile application. As shown at block 804, the method 800 includes determining a predicted future time of an anticipated follow-up (i.e., related to the subject matter of the first social media post) social media post as described previously above and updating the first social media post to include the predicted future time (for example, as shown in FIG. 10).

According to some embodiments, at block 806 the method 800 includes determining whether the related second social media post (i.e., the anticipated follow-up social media post) has been posted by the predicted future time. For example, if the predicted future time is 1:00 am on Jan. 1, 2019, social network server 410 will determine if a related second social media post (e.g., social media post 700) has been created before 1:00 am on Jan. 1, 2019. If the system determines it has, the method may proceed to block 808 where social network server 410 may update the first social media post 600 to remove the indication of the predicted future time 622. In some embodiments, the social network server 410 may also update the first social media post (e.g., social media post 600) to include an indication of the second social media post as previously described above.

According to some embodiments, if the social network server 410 determines that the anticipated related second social media post has not been created by the predicted future time, then method 800 may proceed to block 810 where the system determines whether the first social media post (e.g., social media post 600) has received a threshold number of views, comments, likes or other such activity to determine whether there is significant user interest in viewing the follow-up content. For example, a threshold number of views could be a predetermined number of views of the post from anyone (e.g., the post must be viewed at least 20 times by anyone) or a predetermined number of views of the post by at least a predetermined unique visitors (e.g., the post must be viewed at least 20 times by at least 10 unique users). In some embodiments, the threshold number of views may be set by an administrator of the system, the user who created the first post, or may be automatically determined by the system based on, for example, machine learning techniques. In some embodiments, if the social network server 410 determines that the anticipated follow-up post has not been made by the predicted future time and the first social media post has not received the threshold number of views, the method 800 may proceed to block 812 in which the social network server 410 may remove the indication of the predicted future time 622 of the anticipated follow-up post from the first social media post. However, if the social network server 410 determines that the first social media post has received at least the threshold number of views, the method 800 proceeds to block 814 where the social network server 410 may transmit a message to a user device 430 associated with the creator of the first social media post to prompt them to upload the anticipated second social media content or provide an indication of whether and/or when they expect to do so. In some embodiments, the prompt may be sent to the user some prior the predicted future time 622 instead of waiting for the predicted time to elapse. If the user indicates that they do not intend to upload such content, the social network server 410 may remove the indication of the predicted future time 622 from the first social media post. Otherwise, the social network server 410 may update the indication of the predicted future time 622 to revise the predicted future time based on the user's response, the location of the user (e.g., as determined from location data from the user device 430), past posting behavior of the user, or other such information.

Additional processes may also be included. It should be understood that the processes depicted in FIGS. 5 and 11 represent illustrations, and that other processes may be added or existing processes may be removed, modified, or rearranged without departing from the scope and spirit of the present disclosure.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
receiving first social media content, wherein the first social media content is displayed in a first social media post associated with a user account;
receiving second social media content comprising, wherein the second social media content is displayed in a second social media post associated with the user account;
determining that the first social media content is correlated to the second social media content based on contextual analysis;
updating the first social media post to include an indication of the second social media post;
determining, a subject matter of the first social media post; and
determining, based on an analysis of the subject matter of the first social media post in view of a social media posting history associated with the user account, a predicted future time of an anticipated follow-up social media post,
wherein updating the first social media post comprises:

providing an indication of the predicted future time of the anticipated follow-up social media post; and
responsive to the second social media content being posted, removing the indication of the predicted future time of the anticipated follow-up social media post and providing the indication of the second social media post.

2. The computer-implemented method of claim 1, wherein the first social media content comprises at least an image and updating the first social media post comprises updating the image to include the indication of the second social media post.

3. The computer-implemented method of claim 1, wherein the first social media content comprises at least text and updating the first social media post comprises providing the indication of the second social media post in association with the text.

4. The computer-implemented method of claim 1, wherein the first social media content further comprises first location data indicative of a first location and the second social media content further comprises second location data indicative of a second location, and determining that the first social media content is correlated to the second social media content comprises determining that the second location is within a predetermined distance of the first location.

5. The computer-implemented method of claim 1, wherein determining that the first social media content is correlated to the second social media content based on contextual analysis comprises:
   determining a first subject matter of the first social media content;
   determining a second subject matter of the second social media content; and
   determining that a degree of similarity between the first subject matter and the second subject matter exceeds a predetermined threshold.

6. The computer-implemented method of claim 1, wherein providing the indication of the second social media post comprises providing, in association with the first social media post, one or more of:
   a portion of text derived from the second social media content; and
   one or more thumbnail images derived from the second social media content.

7. The computer-implemented method of claim 1, wherein updating the first social media post further comprises:
   determining that a follow-up social media post has not been made by the predicted future time of the anticipated follow-up social media post;
   transmitting, to a user device associated with the user account, a message to prompt a user to provide follow-up social media content; and
   receiving, from the user device, the follow-up social media content as the second social media content.

8. The computer-implemented method of claim 1, further comprising:
   receiving user location data from a user device associated with the user account; and
   revising the predicted future time of an anticipated follow-up social media post based on the user location data.

9. The computer-implemented method of claim 1, further comprising:
   receiving third social media content, wherein the third social media content is displayed in a third social media post associated with the user account; and
   revising the predicted future time of an anticipated follow-up social media post based on the third social media content.

10. The computer-implemented method of claim 5, wherein determining a subject matter of a social media content comprises one or more of:
    determining, using image recognition techniques, an identification of one or more objects, people, or locations in an image associated with the social media content; and
    determining, using natural language processing techniques, a subject of a text associated with the social media content.

11. The computer-implemented method of claim 2, wherein the indication of the second social media post comprises an icon that is representative of an existence of the second social media post.

12. The computer-implemented method of claim 11, wherein the icon is selectable to display the second social media post.

13. A system comprising:
    a processor communicatively coupled to a memory, the processor configured to:
        receive first social media content, wherein the first social media content is displayed in a first social media post associated with a user account;
        receive second social media content comprising, wherein the second social media content is displayed in a second social media post associated with the user account;
        determine that the first social media content is correlated to the second social media content based on contextual analysis;
        update the first social media post to include an indication of the second social media post;
        determine, a subject matter of the first social media post; and
        determine, based on an analysis of the subject matter of the first social media post in view of a social media posting history associated with the user account, a predicted future time of an anticipated follow-up social media post,
        wherein updating the first social media post comprises:
            provide an indication of the predicted future time of the anticipated follow-up social media post; and
            responsive to the second social media content being posted, remove the indication of the predicted future time of the anticipated follow-up social media post and providing the indication of the second social media post.

14. The system of claim 13, wherein the first social media content comprises at least an image and updating the first social media post comprises updating the image to include the indication of the second social media post.

15. The system of claim 13, wherein the first social media content comprises at least text and updating the first social media post comprises providing the indication of the second social media post in association with the text.

16. The system of claim 13, wherein determining that the first social media content is correlated to the second social media content based on contextual analysis comprises:
    determining a first subject matter of the first social media content;
    determining a second subject matter of the second social media content; and
    determining that a degree of similarity between the first subject matter and the second subject matter exceeds a predetermined threshold.

17. The system of claim 14, wherein the indication of the second social media post comprises an icon that is representative of the existence of an second social media post.

18. The system of claim 17, wherein the icon is selectable to display the second social media post.

19. A computer program product comprising a computer readable storage medium having program instructions embodied therewith, the program instructions executable by a computer processor to cause the computer processor to perform a method, the method comprising:
- receiving first social media content, wherein the first social media content is displayed in a first social media post associated with a user account;
- receiving second social media content comprising, wherein the second social media content is displayed in a second social media post associated with the user account;
- determining that the first social media content is correlated to the second social media content based on contextual analysis;
- updating the first social media post to include an indication of the second social media post;
- determining, a subject matter of the first social media post; and
- determining, based on an analysis of the subject matter of the first social media post in view of a social media posting history associated with the user account, a predicted future time of an anticipated follow-up social media post, wherein updating the first social media post comprises:
- providing an indication of the predicted future time of the anticipated follow-up social media post; and
- responsive to the second social media content being posted, removing the indication of the predicted future time of the anticipated follow-up social media post and providing the indication of the second social media post.

* * * * *